United States Patent [19]

Rolfvondenbaumen

[11] Patent Number: 4,859,323
[45] Date of Patent: Aug. 22, 1989

[54] OIL SAND CLEANING APPARATUS

[76] Inventor: Theodore Rolfvondenbaumen, 5614 - 26th Street, Lloydminster, Alberta, Canada, T9V 2C6

[21] Appl. No.: 194,505

[22] Filed: May 16, 1988

[51] Int. Cl.$^4$ ............................................. B01D 21/00
[52] U.S. Cl. ..................................... 210/181; 134/10; 209/3; 209/17; 210/182; 210/195.1; 210/202; 210/259; 210/295; 210/512.1
[58] Field of Search .............. 210/181, 182, 188, 202, 210/259, 262, 388, 416.5, 767, 523, 512.1, 196, 195.1, 294, 295, 298; 209/171, 172.5; 134/10, 24; 166/357, 303; 252/328, 330

[56] References Cited

U.S. PATENT DOCUMENTS

| | | | |
|---|---|---|---|
| 3,208,201 | 9/1965 | Oliver, III | 210/259 |
| 3,637,522 | 1/1972 | Young | 252/328 |
| 4,336,136 | 6/1982 | Giguere | 210/182 |
| 4,350,596 | 9/1982 | Kennedy, Jr. | 210/188 |
| 4,358,373 | 11/1982 | Jubenville | 210/181 |
| 4,426,293 | 1/1984 | Mason et al. | 210/295 |
| 4,636,308 | 1/1987 | Summers | 210/195.1 |
| 4,717,470 | 1/1988 | Apeland | 209/17 |
| 4,737,282 | 4/1988 | Senyard, Sr. et al. | 210/188 |

Primary Examiner—Frank Spear
Assistant Examiner—Joseph Drodge
Attorney, Agent, or Firm—Harold H. Dutton, Jr.

[57] ABSTRACT

Heavy oil production results in oily sand waste products, the disposal of which presents a problem. Since the oily sand causes rapid wear on heavy oil treatment equipment, it is important to deal with the problem early in the treatment process. For this reason recovery of the bulk of the sand is effected at the so-called free water knockout, which is a tank operating at atmospheric pressure for removing free water and sand from the heavy oil. Sand drops to the bottom of the tank. Oil separates from the water, rises to the top of the tank and overflows to the next piece of treatment equipment. Water is siphoned from the bottom of the tank and fed to a water disposal plant. The apparatus described herein includes a pump for feeding a sand slurry from the bottom of the tank to hydrocyclones, dewatering screens to which fresh water is added to clean the sand and remove additional moisture therefrom, and a hopper for receiving the clean sand. Water from the hydrocyclones is returned to the bottom of the tank, and water from the screen is pumped into the sand at the bottom of the tank to maintain the sand in a slurry.

6 Claims, 1 Drawing Sheet

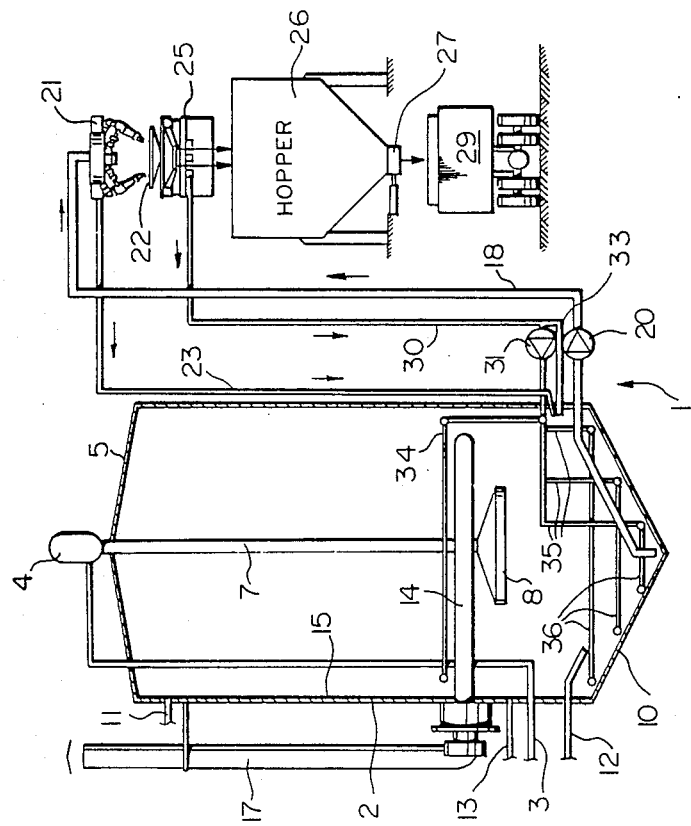

OIL SAND CLEANING APPARATUS

BACKGROUND OF THE INVENTION

This invention relates to an oily sand cleaning system, and in particular to a sand handling apparatus for use in such a system.

Heavy oil production presents the problem of disposal of oily sand waste products. The heavy oil enters a treating facility via a pressurized treater for cleaning the oil to pipeline specifications. The treaters are routinely desanded, i.e. sand is removed from the treaters and placed in pits. A backhoe and trucks regularly transfer the oily sand to an ecology pit. The volume of sand contributes to high wear and maintenance problems on the treaters and associated sand handling equipment. Conventionally, disposal of the products is effected by spreading the products on roads near production facilities. The time and equipment involved in this process contribute significantly to higher operating costs. The development of heavy oil resources is expected to increase significantly in the future with a corresponding increase in the quantities of oily sand waste. Eventually there will not be a sufficient number of roads near production facilities to permit economical disposal.

The object of the present invention is to overcome the above identified problems by providing a relatively simple apparatus for recovering sand from a tank used to separate sand from oil and water.

SUMMARY OF THE INVENTION

Accordingly, the present invention relates to an apparatus for recovering sand from a tank for separating sand from oil and water comprising:

(a) first perforate pipe means in the bottom of the tank for introducing a liquid under pressure into the sand for maintaining the sand in a slurry and facilitating the separation of oil from the sand;

(b) first Pump means for discharging a sand slurry from the tank;

(c) hydrocyclone separator means for receiving the slurry from said first pump means and separating liquid from the slurry; and (d) screen means for receiving sand from said separator means and water for further cleaning the sand.

BRIEF DESCRIPTION OF THE DRAWING

The invention will be described in greater detail with reference to the accompanying drawing, which is a schematic flow diagram of the apparatus of the present invention.

DESCRIPTION OF THE PREFERRED EMBODIMENT(S)

The apparatus of the present invention which is generally indicated at 1 is intended for use with a device for separating water and oil from oily sand. The device includes a tank 2, which is commonly referred to as a "free water knockout". The tank 2 operates at atmospheric pressure and is designed to remove free water and sand remaining from heavy oil production. A heavy oil/water sand mixture is introduced into the tank 2 through an inlet line 3, which carries the mixture upwardly to a gas boot 4 mounted on the top wall 5 above the generally conical bottom wall 10 of the tank.

Sand separating from the mixture settles to the bottom of the tank 2. Oil separating from the water rises to the top of the tank 2 for discharge through an overflow pipe 11 for transfer to the next element of processing equipment. Any residual sand in the oil is separated in treaters and returned to the tank 2 by a pipe 12. The treaters are heat treaters used to clean the oil to pipeline specifications using heat and chemicals. Water is removed from the tank 2 via an outlet duct 13 and fed to a water disposal plant (not shown).

The oil and water mixture in the tank 2 is heated by means of a pair of U-type firetubes 14, which use natural gas as fuel. The ends of the firetubes extend through the side wall 15 of the tank 2. Flame is contained within the firetubes, and the oil/water mixture contacts the outer surfaces of the tubes. Combustion gases from the firetubes 14 are discharged via a standpipe 17, which creates a draft in the firetubes, and exhausts flue gases above the top wall 5 of the tank 2.

The sand slurry settling to the bottom of the tank 2 is pumped through a pipe 18 by a sand pump 20. The slurry is fed to hydrocyclones 21, which are off the shelf items available from several sources. The number and size of the hydrocyclones are determined by the quantity of slurry and the size distribution of the sand grains. The sand slurry is pumped into the hydrocyclones 21 at a velocity sufficient that inner and outer vortexes are created in the hydrocyclones by centrifugal action. The outer vortexes consist of heavier sand particles and a small quantity of water. The sand underflow of the outer vortexes is fed to a trough 22. The inner vortex of each hydrocyclone 21 consists of oil and water, which is recycled to the tank 2 through a pipe 23. The oil/water mixture is fed into the tank 2 near the bottom end thereof for re-use in the cleaning process.

The sand from the hydrocyclones 21 is fed into the trough 22 to which fresh water is added to clean the sand still more. The sand flows onto a dewatering screen 25. Most of the clean sand produced by the oily sand cleaning process is very fine, packs easily and has a high shear effect. Accordingly, vibration amplitudes of the dewatering screen should be low. High vibration amplitudes result in quick screen wear and the possibility of structural failure of the equipment. Larger particles in the sand contribute to plugging and wear on the hydrocyclones 21. For this reason, it is necessary to monitor hydrocyclone performance on a regular basis.

Finally, the sand is dumped into a hopper 26 for discharge through a sliding dump gate 27 into a truck 29 or other means of transportation. The hopper 26 contains high frequency, low amplitude, rotary vibrators (not shown) for facilitating sand removal. The gate 27 is oversized so that the sand can flow easily. In order to cause the sand to flow out of the hopper 26, the vibrators should be of the type described, the hopper sides should be sloped, and the opening should be as large as possible.

Liquid removed from the sand by the dewatering screen 25 is returned to the tank through line 30 and a desand pump 31. Additional liquid is pumped through the pump 31 through a line 33 connected to the water zone of the tank 2, i.e. some of the water separated from the mixture in the tank 2 is recycled through the pump 31. From the pump 31 the liquid is passed through line 34 for heating by the heaters 14, and through lines 35 to desand rings 36. The rings 36 are defined by pipes defining annuli, which decrease in diameter towards the bottom end of the tank 2. Nozzles (not shown) re provided in the pipes. The nozzles are spaced apart by approximately thirty cm, so that water pumped through the nozzles creates sufficient turbulence in the bottom of the tank 2 to maintain the sand in a slurry. The water also aids in the removal of oil from the sand. It is the recycling of the liquid separated by the hydrocyclones 21 and the dewatering screen 25 which renders the separation method more effective than the cleaning tank alone. It will be appreciated that the water used to create turbulence in the bottom of the tank can come from a source other than the dewatering screen.

The apparatus described above reduces the volume of waste product requiring disposal by processing the product to a more manageable form. The apparatus reduces the number of truckloads of waste products to be handled, obviates the need for the cleaning of desand pits and reduces the fluid handling requirements at both desand pits and at temporary storage sites in ecology pits. The reduction in the volume of waste also reduces the number or size of ecology pits required. The free water knockout tank 2 is one of the first pieces of process equipment to treat the heavy oil. By providing for the continuous extraction of sand in the free water knockout, wear and tear on downstream treating devices is reduced. Sand from the downstream treaters is also fed to the tank 2 rather than to pits.

The oil reclaimed from the oily sand is usually a poor quality, difficult to treat emulsion which benefits from passing through the treatment system a second time.

What I claim is:

1. An apparatus for recovering sand from a tank and for separating sand from oil and water comprising:
   first perforate pipe means in the bottom of the tank for introducing a liquid under pressure into the sand for maintaining the sand in a slurry and facilitating the separation of oil from the sand;
   first pump means for discharging a sand slurry from the tank;
   hydrocyclone separator means for receiving the slurry from said first pump means and for separting liquid from the slurry;
   screen means for receiving sand from said separator means and receiving added water for further cleaning the sand;
   means for returning the liquid separated from the sand by said hydrocyclone separator means to said tank and second pump means for returning the added water from said screen means to said first pipe means.

2. An apparatus according to claim 1, wherein said first pipe means includes a plurality of annular pipes in the tank, and spaced apart nozzles in said pipes for discharging liquid into the sand in a lower portion of the tank.

3. An apparatus according to claim 2, including heater means in the tank for heating the sand, oil and water mixture; and third pipe means for directing the water returned to said tank means by said second pump means to said heater means for heating the returned water.

4. An apparatus according to claim 3, including first vibrator means for imparting low amplitude vibrations to said screen means for screening fine sand.

5. An apparatus according to claim 4, including hopper means for receiving sand from said screen means.

6. An apparatus according to claim 5, including high frequency, low amplitude second vibrator means in said hopper means for facilitating the discharge of sand from said hopper means.

* * * * *